United States Patent
Takami et al.

(10) Patent No.: US 7,469,211 B2
(45) Date of Patent: Dec. 23, 2008

(54) VOICE CONTROL SYSTEM SUBSTITUTING THE OPPOSITELY-WORKING COMMAND IN A PAIR IF THE RECOGNIZED COMMAND IS NOT SELECTABLE FOR THE GIVEN SYSTEM STATE

(75) Inventors: Masayuki Takami, Hamamatsu (JP); Tooru Nada, Kariya (JP)

(73) Assignee: DENSO CORPORATION, Kariya (JP)

( * ) Notice: Subject to any disclaimer, the term of this patent is extended or adjusted under 35 U.S.C. 154(b) by 815 days.

(21) Appl. No.: 10/602,687

(22) Filed: Jun. 25, 2003

(65) Prior Publication Data
US 2004/0030560 A1 Feb. 12, 2004

(30) Foreign Application Priority Data
Jun. 28, 2002 (JP) ............................. 2002-189481
Apr. 14, 2003 (JP) ............................. 2003-109283

(51) Int. Cl.
*G10L 15/22* (2006.01)
(52) U.S. Cl. ...................................................... 704/275
(58) Field of Classification Search .................. 704/275
See application file for complete search history.

(56) References Cited

U.S. PATENT DOCUMENTS

| 4,501,012 A | 2/1985 | Kishi et al. | |
| 6,598,016 B1* | 7/2003 | Zavoli et al. | 704/251 |
| 6,937,982 B2* | 8/2005 | Kitaoka et al. | 704/252 |
| 7,035,806 B2* | 4/2006 | Kojima et al. | 704/275 |
| 7,099,829 B2* | 8/2006 | Gomez | 704/275 |
| 2002/0049596 A1* | 4/2002 | Burchard et al. | 704/270 |
| 2002/0138181 A1* | 9/2002 | Mori et al. | 701/1 |

FOREIGN PATENT DOCUMENTS

| JP | A-59-125335 | 7/1984 |
| JP | A-4-273299 | 9/1992 |
| JP | A-5-249989 | 9/1993 |
| JP | A-10-73448 | 3/1998 |
| JP | A-11-237895 | 8/1999 |
| JP | A-2000-20086 | 1/2000 |
| JP | A-2000-148177 | 5/2000 |
| JP | A-2000-250588 | 9/2000 |

OTHER PUBLICATIONS

Office Action dated Apr. 25, 2008 in corresponding JP Application No. 2003-109283, and English translation.

* cited by examiner

*Primary Examiner*—Talivaldis I Smits
(74) *Attorney, Agent, or Firm*—Posz Law Group, PLC

(57) ABSTRACT

A speech recognition (SR) dictionary switching unit selects a SR dictionary including commands that are for controlling target devices and selectable in current operating states detected by a device-state detecting unit. When a SR engine recognizes an uttered command of a user, it collates the speech with the commands included in the selected SR dictionary. If the command is not selectable in the current operating states of the target devices and is one of a reciprocal pair of commands working oppositely to each other, the other of the reciprocal pair is substituted for the command. This results in decreasing unreasonable and unpleasant feeling of the user in voice manipulation.

4 Claims, 8 Drawing Sheets

US 7,469,211 B2

VOICE CONTROL SYSTEM SUBSTITUTING THE OPPOSITELY-WORKING COMMAND IN A PAIR IF THE RECOGNIZED COMMAND IS NOT SELECTABLE FOR THE GIVEN SYSTEM STATE

CROSS REFERENCE TO RELATED APPLICATIONS

This application is based on and incorporates herein by reference Japanese Patent Applications No. 2002-189481 filed on Jun. 28, 2002, and No. 2003-109283 filed on Apr. 14, 2003.

FIELD OF THE INVENTION

The present invention relates to a voice control system that recognizes a speech uttered by a user and controls a target device according to the speech of the user with considering an operating state of the target device.

BACKGROUND OF THE INVENTION

In a voice control system controlling a target device by recognizing a speech uttered by a user, as shown in FIG. 9, as the user utters the speech as a command through a microphone Z1, a speech recognition engine (SR engine) Z2 recognizes the uttered speech as a recognized command to output the recognized command to a device-manipulating signal generating unit Z3. The SR engine Z2 simultaneously instructs a speech synthesis engine (SS engine) Z4 to synthesize a piece of speech synthesis data that notifies that the uttered speech of the user is recognized and to output it to a speaker Z5. The user can thereby confirm that the uttered speech is successfully recognized.

The signal generating unit Z3 then outputs, based on the recognized command outputted by the SR engine Z2, a control signal to a target device Z6. An operating state of the target device Z6 is thereby changed based on the control signal. When changing of the operating state is completed, the target device Z6 outputs a signal notifying the completion of changing the operating state to the SS engine Z4. The SS engine Z4 synthesizes a piece of speech synthesis data, which notifies the completion of changing the operating state, and outputs it to the speaker Z5. The user can thereby confirm that the operating state of the target device Z6 is changed.

However, in the above case, the then operating state of the target device at a time when the uttered speech is recognized is not considered. Therefore, when the user utters a command that is unable to be executed in the operating state of the time, problems are imposed as follows.

For instance, it is supposed that the user utters a radio station of an FM mode while an AM mode of the radio is received. Here, the speech synthesis engine Z4 talks back, as an echo message, a name of the radio station of the FM mode as soon as the uttered radio station is successfully recognized. However, since the radio station of the FM mode cannot be selected at the AM mode, an advisory message that, after the current AM mode is shifted into the FM mode, the radio station of the FM mode should be selected is announced. Here, the user feels unpleasant about voice manipulation since the advisory message indicating failure of the voice manipulation is announced posterior to the echo massage indicating that the uttered speech is successfully recognized. It is furthermore supposed that, while an audio is turned on (in an ON state), the speech recognition engine Z2 mis-recognizes "TURN OFF AUDIO" uttered by the user as a command of "TURN ON AUDIO." Here, an advisory message of "AUDIO IS ALREADY TURNED ON" is then announced. Here, since the operating state of the device of the time is not considered, the advisory message ends up in being inappropriate or showing being mis-recognized.

SUMMARY OF THE INVENTION

It is an object of the present invention to provide a voice control system that is capable of properly recognizing a speech uttered by a user and thereby controlling a target device by considering an operating state of the device.

To achieve the above object, a voice control system is provided with the following. Speech recognition data are stored with including a plurality of reference commands. An operating state of a device is detected. Based on the operating state, selectable reference commands are designated. A speech is thereby recognized as one of the selectable reference commands. This structure prevents an inconsistent situation where an operating state of a device cannot be changed as intended by the user even if a user's uttered speech is successfully recognized. Furthermore, it results in decreasing frequency with which the user's uttered speech is mis-recognized, and relieving user's unreasonable and unpleasant feeling in voice manipulation.

In another aspect of the present invention, a voice control system is provided as follows. Speech recognition data are stored including a plurality of reference commands. A speech is recognized as a recognized reference command included in the reference commands. An operating state of a device is detected. When the recognized reference command is not selectable in the operating state, one of selectable reference commands is substituted for the recognized reference command. This structure enables the user to not need to repeat an utterance till an intended command is determined. This results in relieving botheration of the user in voice manipulation.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
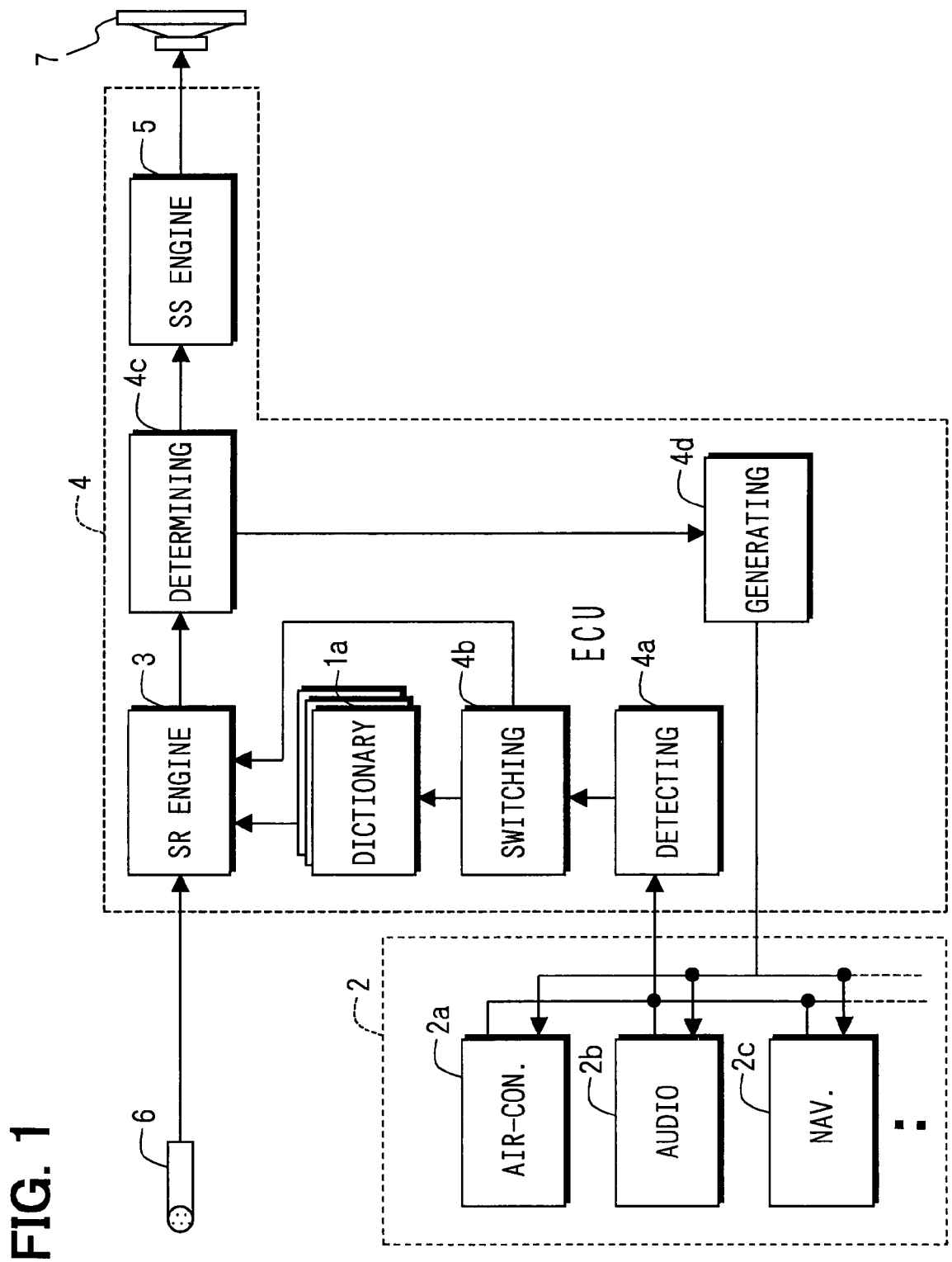
FIG. 1 is a schematic block diagram showing overall structure of a voice control system according to a first embodiment of the present invention.

Referring to FIG. 1, overall structure of a voice control system according to a first embodiment of the present invention will be explained below. The voice control system executes speech recognition (SR) to recognize a command (speech) uttered by a user based on operating states of target devices 2 provided in a vehicle, and thereby controls one of the target devices 2.

An electronic control unit (ECU) 4 includes: speech recognition dictionaries (SR dictionary) 1a; a speech recognition engine (SR engine) 3; a device-state detecting unit 4a; a speech recognition dictionary switching unit (SR dictionary switching unit) 4b; a speech recognition result determining unit (SR result determining unit) 4c; a device-manipulating signal generating unit 4d; and a speech synthesis engine (SS engine) 5.

The SR dictionaries 1a as speech recognition data (SR data) store reference commands for recognizing the speech uttered by the user. Each of the SR dictionaries 1a includes selectable reference commands that can be selected in a set of operating states of the target devices 2, as controlled targets, such as an air-conditioner 2a, an audio 2b, a navigation system 2c, and the like.

For instance, a group of SR dictionaries 1a used in an ON state of the air-conditioner 2a (while the air-conditioner is being turned on) includes a reference command for turning off the air-conditioner 2a, but does not include a reference command for turning on the air-conditioner 2a. Another group of SR dictionaries 1a used in a case where two dimensional display is being executed in the navigation system 2c includes a reference command for switching into three dimensional display without a reference command for switching into the two dimensional display.

The SR engine 3 computes, by using a relevant SR dictionary including selectable reference commands in a corresponding set of operating states of the target devices 2, concordance rates, as result of collating the speech uttered, by the user through a microphone 6, with each of the reference commands stored in the relevant SR dictionary 1a.

The SS engine 5 synthesizes pieces of voice data for talking back a result of speech recognition corresponding to a speech uttered by the user, or for notifying a result of controlling the target device 2. The synthesized pieces of voice data are outputted to a speaker 7 for notifying the user.

The device-state detecting unit 4a is connected with a plurality of the target devices 2 such as the air-conditioner 2a, the audio 2b, and the like, and detects operating states of the target devices 2 by using interrupt handling at an interval. Here, as a detecting method, an event-driven method can be adopted. In the event-driven method, changing of the operating state is detected by a trigger signal that is outputted from a target device 2 each time an operating state of the target device 2 is changed.

The SR dictionary switching unit 4b selects a SR dictionary corresponding to a relevant set of operating states in conjunction with timing when the detecting unit 4a detects changing of an operating state of a target device 2. The SR dictionary switching unit 4b then instructs, based on the selecting result, the SR engine 3 to switch the SR dictionaries 1a. The SR dictionary switching unit 4b also instructs the SR engine 3 to interrupt and resume the speech recognition.

The SR result determining unit 4c obtains, from the SR engine 3, the concordance rates between the uttered speech and the reference commands stored in the relevant SR dictionary 1a, so as to determine, as a determined command, a reference command having the highest concordance rate.

The device-manipulating signal generating unit 4d obtains the determined command determined by the determining unit 4c and outputs to the corresponding target device 2 a device-manipulation signal. The corresponding target device 2 thereby changes an operating state according to the device-manipulation signal.

Figure 2:
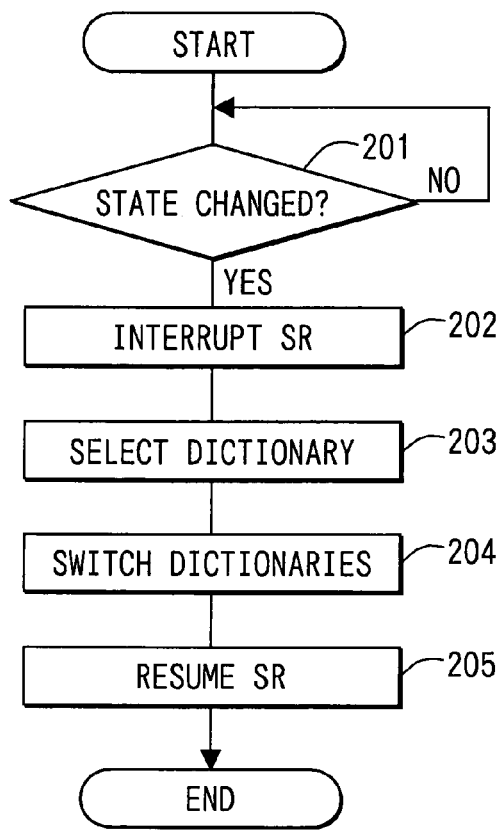
FIG. 2 is a flow diagram explaining processing of switching speech recognition dictionaries in the voice control system according to the first embodiment.

Processing of switching the SR dictionaries 1a in the voice control system will be explained with referring to FIG. 2. The processing is executed at an interval.

At Step 201, operating states of the target devices 2 are detected and it is determined whether the respective operating states are changed. Changing of each of the operating states is checked whether a current operating state detected at this timing is the same as a preceding operating state that is detected at a preceding timing. When a certain operating state is determined to be changed, the processing proceeds to Step 202.

At Step 202, prior to switching the SR dictionaries 1a, speech recognition is interrupted to thereby be prevented from being executed during the switching of the dictionaries 1a. If the speech recognition is executed during the switching, problems may occur. When input manipulation is executed by uttering more than one command, inconsistent response may be generated or the speech recognition may be disabled in the middle of the processing.

At Step 203, a SR dictionary 1a corresponding to a relevant set of current operating states, including the changed certain operating state, of the target devices 2 is selected. At Step 204, the selected SR dictionary 1a is substituted through switching of the SR dictionaries 1a.

At Step 205, the speech recognition is resumed. Namely, the SR engine 3 resumes, with using the newly switched SR dictionary 1a, the speech recognition that has been interrupted.

Here, if the ECU 4 detects an operating state of a target device 2 by the event-driven method, the processing is started from Step 202 each time the ECU 4 receives a trigger signal outputted each time the operating state of the target device 2 is changed.

Figure 3:
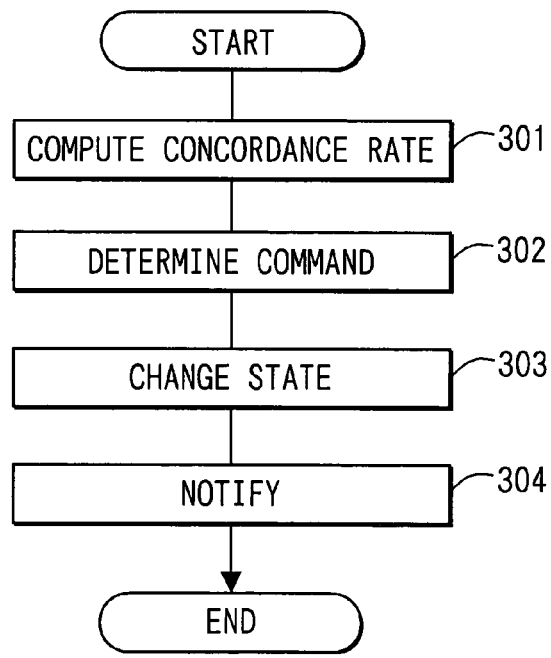
FIG. 3 is a flow diagram explaining processing of changing operating states of target devices based on an uttered speech in the voice control system according to the first embodiment.

Processing of changing the operating state of the target device 2 according to the speech uttered by the user in the voice control system will be explained below with referring to FIG. 3.

At Step 301, concordance rates are computed between the user's uttered speech and reference commands stored in the relevant SR dictionary.

At Step 302, the SR engine 3 obtains the computed concordance rates, and determines that a reference command having the highest concordance rate is the command uttered by the user.

At Step 303, a device-manipulating signal corresponding to the determined command is outputted to the target device 2. As a result, the target device 2 thereby changes the operating state according to the device-manipulating signal.

At Step 304, a piece of voice data that notifies to the user that the operating state of the target device 2 is changed is synthesized to be outputted to the speaker 7.

Here, notification of changing the operating state of the target device 2 to the user can be also executed by using a liquid crystal display of the navigation system 2c.

As explained above, a voice control system of the first embodiment detects and determines changing of an operating state of a certain target device 2. The voice control system thereby selects a corresponding SR dictionary 1a. The corresponding SR dictionary 1a includes reference commands that are able to be selected in the current changed operating state of the certain target device 2, and simultaneously in a set of current operating states of the target devices 2 including the certain target device 2. The SR engine 3 computes concordance rates between an uttered speech (command) and reference commands stored in the corresponding SR dictionary 1a. A reference command having the highest concordance rate is determined as the uttered command. This structure prevents an inconsistent situation where an operating state of a target device 2 cannot be changed as intended by the user even if a user's uttered speech is successfully recognized. Furthermore, it results in decreasing frequency with which the user's uttered speech is mis-recognized, and relieving user's unreasonable and unpleasant feeling in voice manipulation. Each SR dictionary includes reference commands that are selectable in a set of operating states of the target devices 2. The selectable reference commands are thereby rapidly designated.

Modification of the first embodiment will be explained below.

Figure 4:
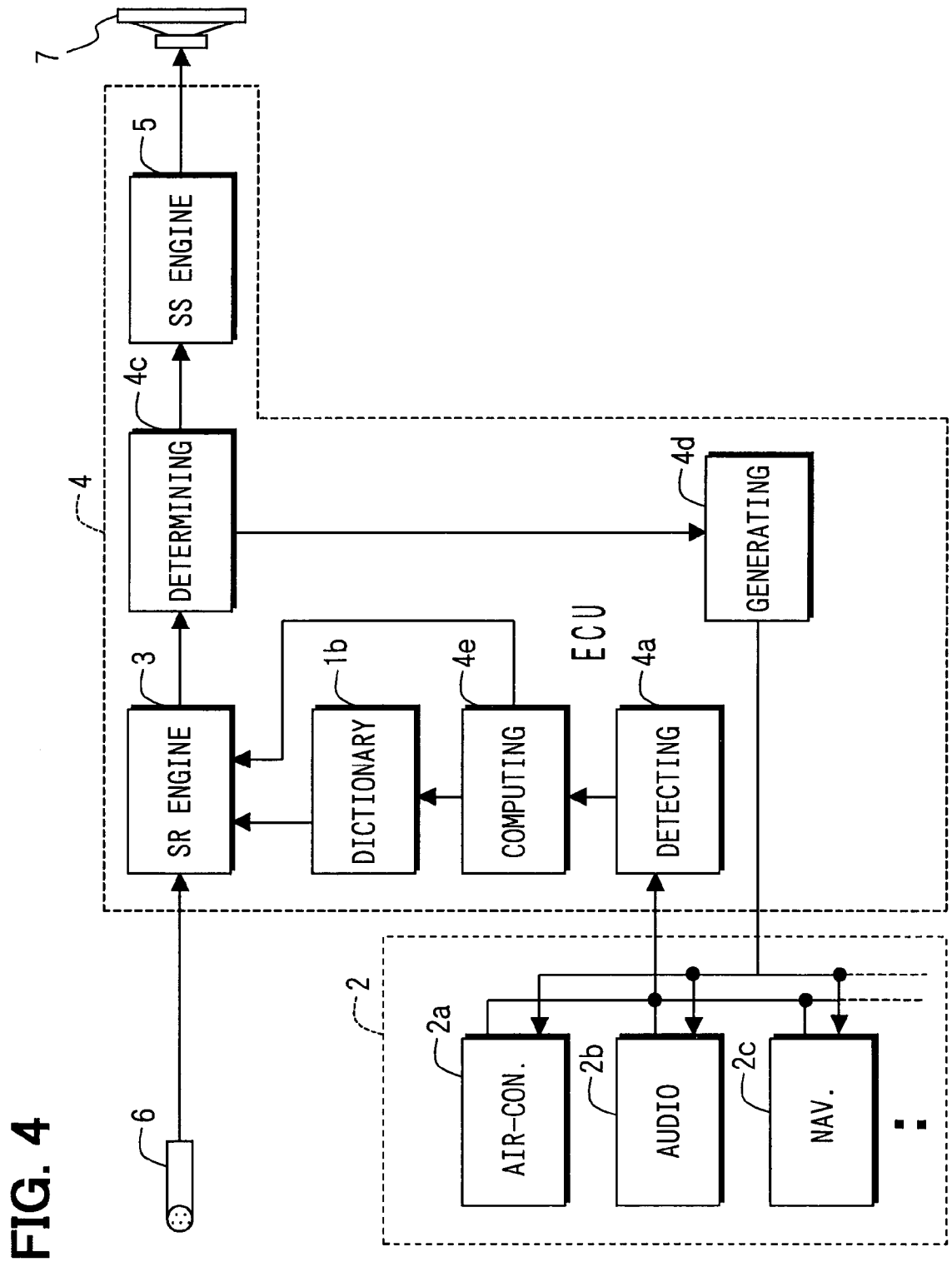
FIG. 4 is a schematic block diagram showing overall structure of modification of the voice control system according to the first embodiment.

FIG. 4 shows overall structure of modification of the voice control system according to the first embodiment. In this modification, as shown in FIG. 4, the SR dictionary switching unit 4b of the first embodiment is replaced with a designating data computing unit 4e. Furthermore, a SR dictionary 1b is provided in this modification for storing all reference commands for controlling the target devices 2. By contrast, a plurality of the SR dictionaries are provided in the first embodiment for respectively storing reference commands that are selectable in a set of operating states of the target devices 2.

The designating code computing unit 4e computes designating codes for reference commands each time the device-state detecting unit 4a detects change of an operating state of a target device 2. Kinds of the designating codes are "1" for selectable reference commands that are able to be selected in the detected current operating state, and "0" for unselectable reference commands that are unable to be selected in the detected current operating state.

The SR engine 3 computes a concordance rate between a user's uttered speech and each reference command stored in the SR dictionary 1b. The computed concordance rate is then multiplied by the designating code and a final concordance rate is thereby obtained.

Figure 5:
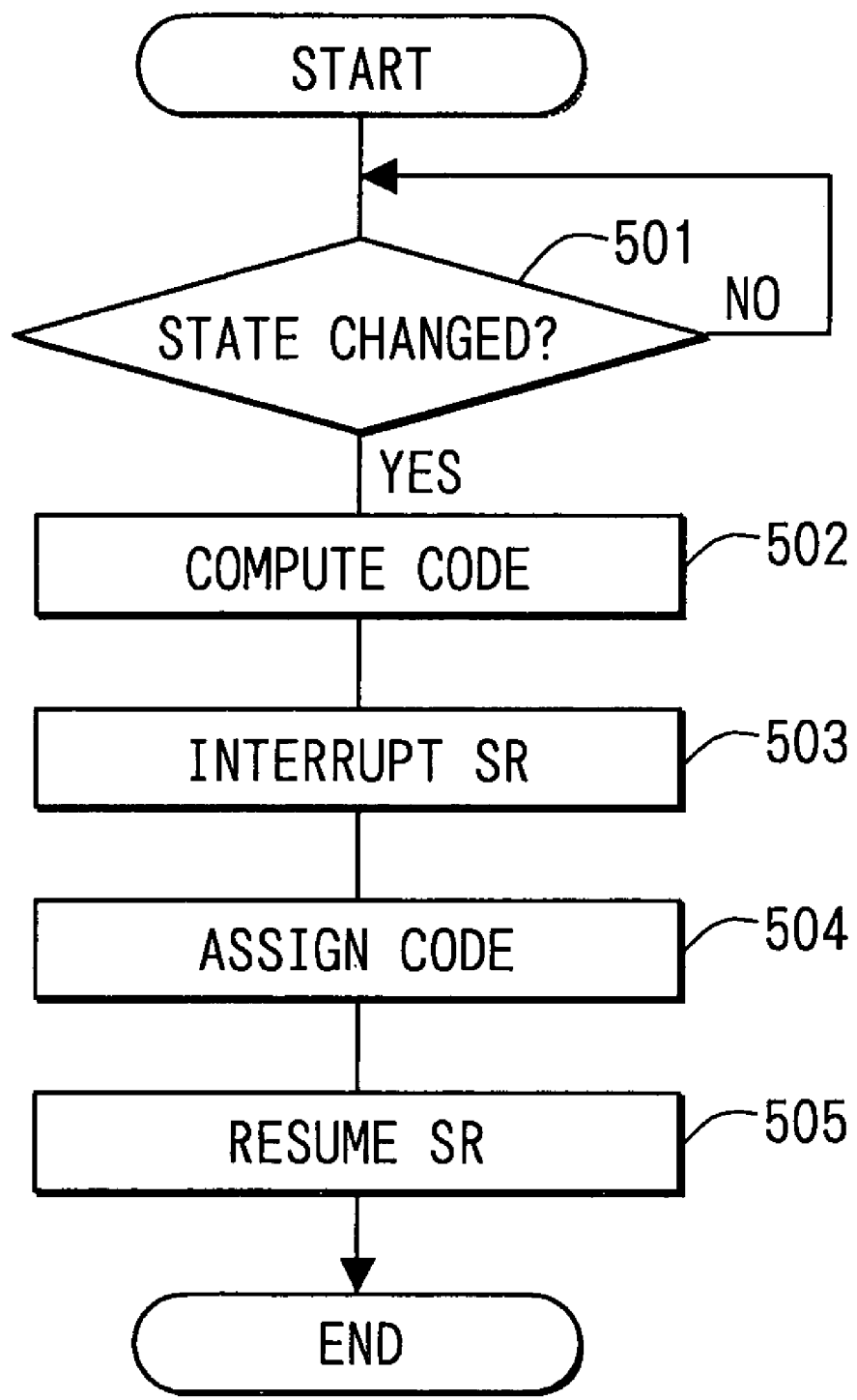
FIG. 5 is a flow diagram explaining processing of assigning designating codes to reference commands of the speech recognition dictionaries in the modification of the voice control system according to the first embodiment.
Figure 6:
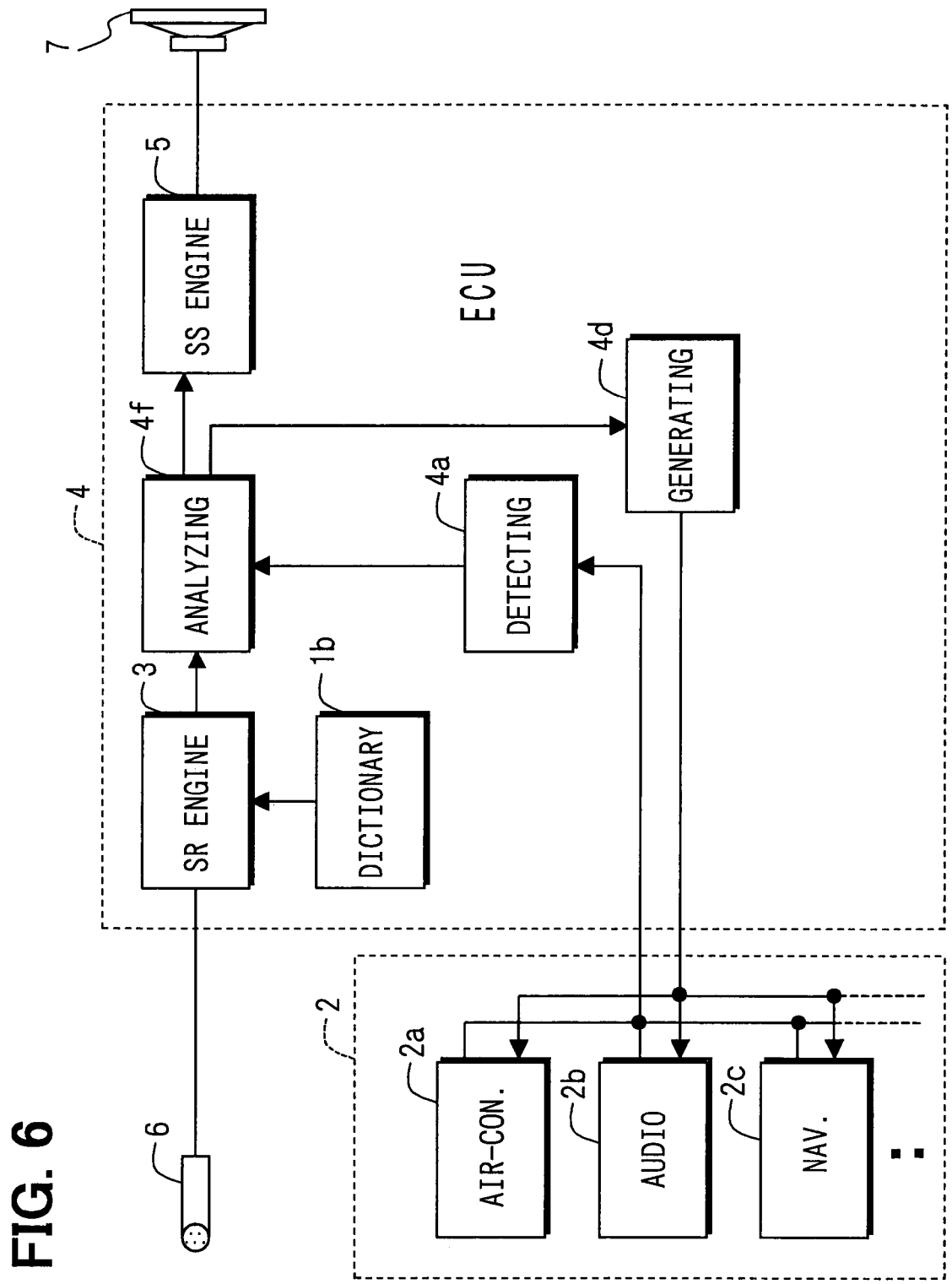
FIG. 6 is a is a schematic block diagram showing overall structure of a voice control system according to a second embodiment of the present invention.

Other structure is the same as in the preceding first embodiment, so that additional explanation will be eliminated below. Processing of this modification for assigning the designating code to each reference command will be explained below with referring to FIG. 5.

At Step 501, operating states of the target devices 2 are detected and it is determined whether the respective operating states are changed. Changing of each of the operating states is checked whether a current operating state detected at this timing is the same as a preceding operating state that is detected at a preceding timing. When the operating state of a certain target device 2 is determined to be changed, the processing proceeds to Step 502.

At Step 502, it is determined whether each reference command corresponding to the certain device 2 is able to be selected. When a certain reference command is determined to be able to be selected, designating code "1" is computed for the certain reference command. When a given reference command is determined to be unable to be selected, designating code "0" is computed for the given reference command.

At Step 503, prior to assigning the designating codes to the respective reference commands, speech recognition is interrupted.

At Step 504, the designating codes computed at Step 502 are assigned to the respective reference commands. Here, there is a case where a preceding designating code is previously assigned according to a preceding operating state. In this case, after the preceding designating code is erased, the newly computed designating code is assigned.

At Step 505, the speech recognition is resumed. Namely, the SR engine 3 hereafter computes concordance rates using the SR dictionary 1b including each reference command to which the designating code is assigned according to the current operating states of the target devices 2.

As explained above, in this modification, each time operating states of the target devices 2 change, the designating code computing unit 4e computes and assigns designating codes for the reference commands which are stored in the SR dictionary 1b and affected by the change of the operating states. Here, selectable reference commands have designating code "1," while the unselectable reference commands have designating code "0."

For instance, when the air-conditioner 2a is turned on, a reference command for turning on the air-conditioner 2a has designating code "0," while a reference command for turning off the air-conditioner 2a has designating code "1." When display of the navigation system 2c is switched to two dimensional display, a reference command for switching into the two dimensional display has designating code "0," while a reference command for switching into three dimensional display has designating code "1."

In computing the concordance rate, the designating code multiples the concordance rate, so that a concordance rate of a reference command of designating code "0" ends up in being zero. This structure thereby prevents a reference command of designating code "0" from being selected. This structure enables memory volume of the SR dictionary 1b to be reduced since a certain reference command is unnecessarily stored repeatedly.

Second Embodiment

In a second embodiment, a speech recognition result analyzing unit (SR result analyzing unit) 4f is provided for storing mis-recognition lists, each of which includes mis-recongnisable reference commands that are apt to be mis-recognized with respect to each reference command. The SR result analyzing unit 4f computes designating codes for reference commands according to current operating states of the target devices 2. Content of the designating code is the same as in the modification of the first embodiment.

A command is determined correspondingly to a speech uttered by the user as below.

The SR result analyzing unit 4f obtains concordance rates of reference commands for the uttered speech from the SR engine 3, and checks a designating code of a certain reference command having the highest concordance rate. When the designating code of the certain reference command is "1," the certain reference command can be selected in the current operating states of the target devices 2 and thereby is determined as a determined command corresponding to the speech uttered by the user.

By contrast, when the designating code of the certain reference command is "0," a mis-recognition list with respect to the certain reference command is referred to. mis-recognizable reference commands included in the list are checked regarding their designating codes, from a mis-recognizable reference command of the higher concordance rate to one of the lower concordance rate. When a mis-recognizable reference command that has designating code of "1," is confirmed, this reference command is determined as a determined command corresponding to the speech uttered by the user. When any mis-recognizable reference command in the list has not designating code of "1," a reference command having the second highest concordance rate is taken out and processing similar with the above processing in the reference command having the highest concordance rate is repeated.

Other structure is the same as in the first embodiment, so that additional explanation will be eliminated.

Figure 7:
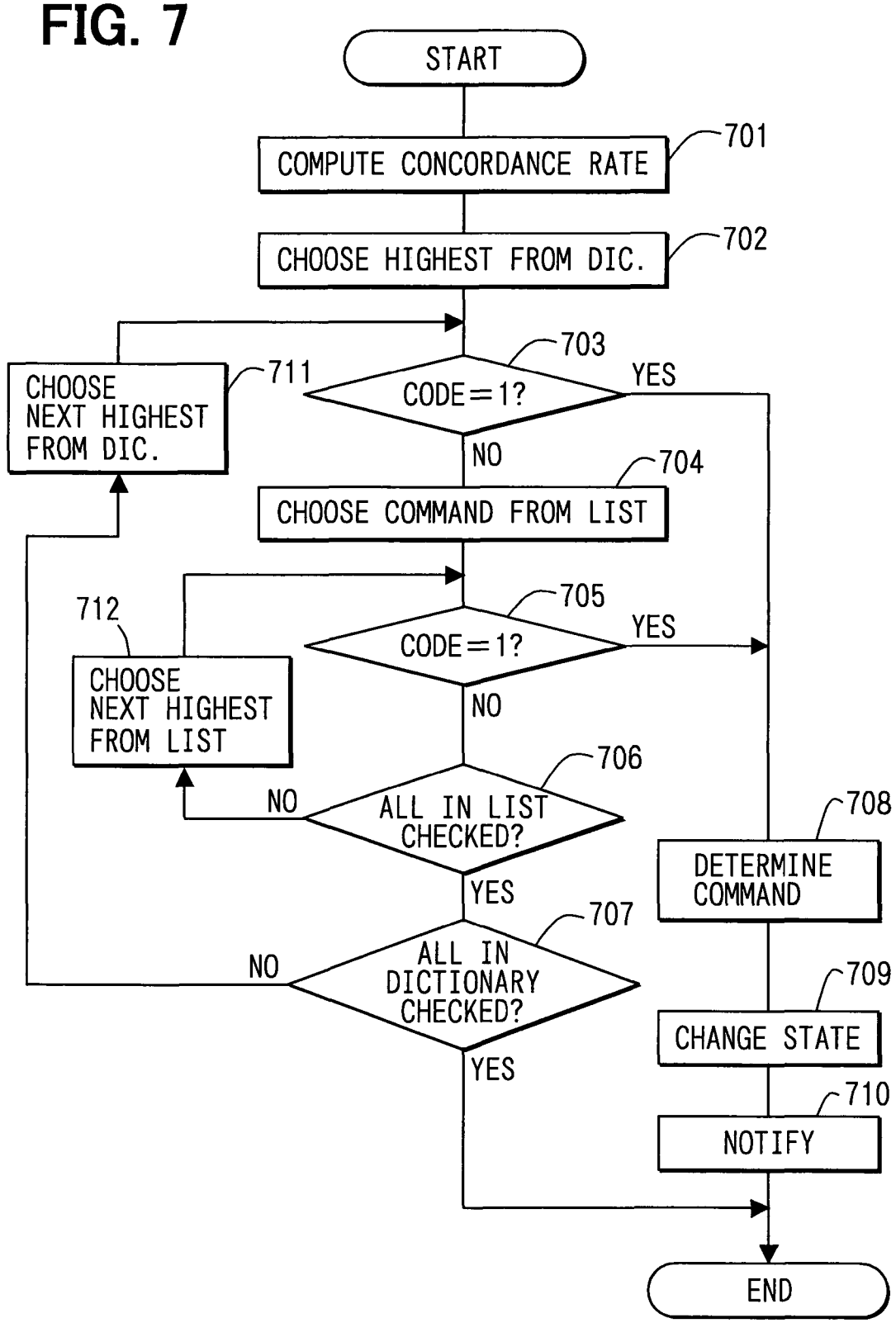
FIG. 7 is a flow diagram explaining processing of changing operating states of a target device based on an uttered speech in the voice control system according to the second embodiment.

Processing of this embodiment for changing an operating state of a target device 2 will be explained below with referring to FIG. 7.

At Step 701, concordance rates between the speech uttered by the user and reference commands in the SR dictionary 1b are computed.

At Step 702, a reference command that has the highest concordance rate is chosen from the SR dictionary 1b.

At Step 703, operating states of the target devices 2 are detected and a designating code of the reference command chosen at Step 702 is computed in the detected operating states of the target devices 2. When the designating code is "1," the reference command can be selected in the current operating states of the target devices 2, and the processing proceeds to Step 708. Otherwise, the processing proceeds to Step 704.

At Step 704, a mis-recognizable reference command having the highest concordance rate is chosen from the mis-recognition list corresponding to the reference command chosen at Step 702. In detail, the mis-recognition list includes an opposite command that is for working, oppositely to the reference command chosen at Step 702, to control operation or functions of target devices. For instance, a mis-recognition list of a reference command that is for turning on operation or a function of a certain target device 2 includes mis-recognizable reference commands that are for turning off the operation or the function of the certain target device 2. A mis-recognition list of a reference command that is for turning off operation or a function of a given target device 2 includes mis-recongnizable reference commands that are for turning on the operation or the function of the given target device 2.

At Step 705, a designating code of the mis-recognizable reference command chosen at Step 704 is computed in the current operating states of the target devices 2 that are detected at Step 703. When the computed designating code is "1," the mis-recognizable reference command can be selected in the current operating states of the target devices 2, and the processing proceeds to Step 708. Otherwise, the processing proceeds to Step 706.

At Step 706, it is determined whether all mis-recognizable reference commands included in the list are checked regarding their designating codes. When all commands are checked regarding the designating codes, the processing proceeds to Step 707. Otherwise, the processing proceeds to Step 712.

At Step 712, a mis-recognizable reference command that has the second highest concord rate is chosen from the mis-recognition list, and the processing returns to Step 705 for repeating the checking of the designating code.

At Step 707, it is determined whether all reference commands included in the SR dictionary 1b are checked regarding their designating codes. When all commands are checked regarding the designating codes, no reference command is determined as the determined command corresponding to the speech uttered by the user, and the processing is terminated. Otherwise, the processing proceeds to Step 711.

At Step 711, a reference command that has the second highest concordance rate is chosen from the SR dictionary 1b, and the processing returns to Step 703 for repeating the checking of the designating code.

At Step 708, the reference command chosen at Step 703 or the mis-recognizable reference command chosen at Step 705 is determined as the determined command corresponding to the speech uttered by the user.

At Step 709, a device-manipulating signal is generated correspondingly to the determined command determined at Step 708, so as to change the operating state of the relevant target device 2.

At Step 710, a piece of voice data for notifying the user that the operating state of the relevant target device 2 is changed is synthesized. The piece of voice data is outputted to the speaker 7 and the change of the operating state of the relevant target device 2 is notified to the user.

As explained above, a voice control system of this embodiment does not determine, as a determined command corresponding to an uttered speech, a certain reference command having the highest concordance rate with the uttered speech, when the certain reference command cannot be selected in current operating states of target devices 2. Instead, the voice control system determines, as the determined command, a given reference command that has the second or latter highest concordance rate or the mis-recognizable reference command included in the mis-recognition list. Here, the given reference command can be selected in the current operating states of the target devices. The user is thereby not needed to repeat utterance till an intended command is determined. This results in relieving botheration of the user in voice manipulation.

Third Embodiment

In a third embodiment, in particular, a reciprocal pair of reference commands that are for working oppositely to each other are explained regarding changing operation or functions of the target devices 2.

The SR dictionary 1b of this embodiment includes reciprocal pairs of reference commands, for instance, a pair of a command for turning on operation of an audio 2b and a command for turning off the operation of the audio 2b, or a pair of a command for turning on display of a navigation system 2c and a command for turning off the display of the navigation system 2c.

Incidentally, reference commands other than the reciprocal pairs of reference commands are recognized as is the case with the preceding embodiments, so that explanation will be eliminated below.

Figure 8:
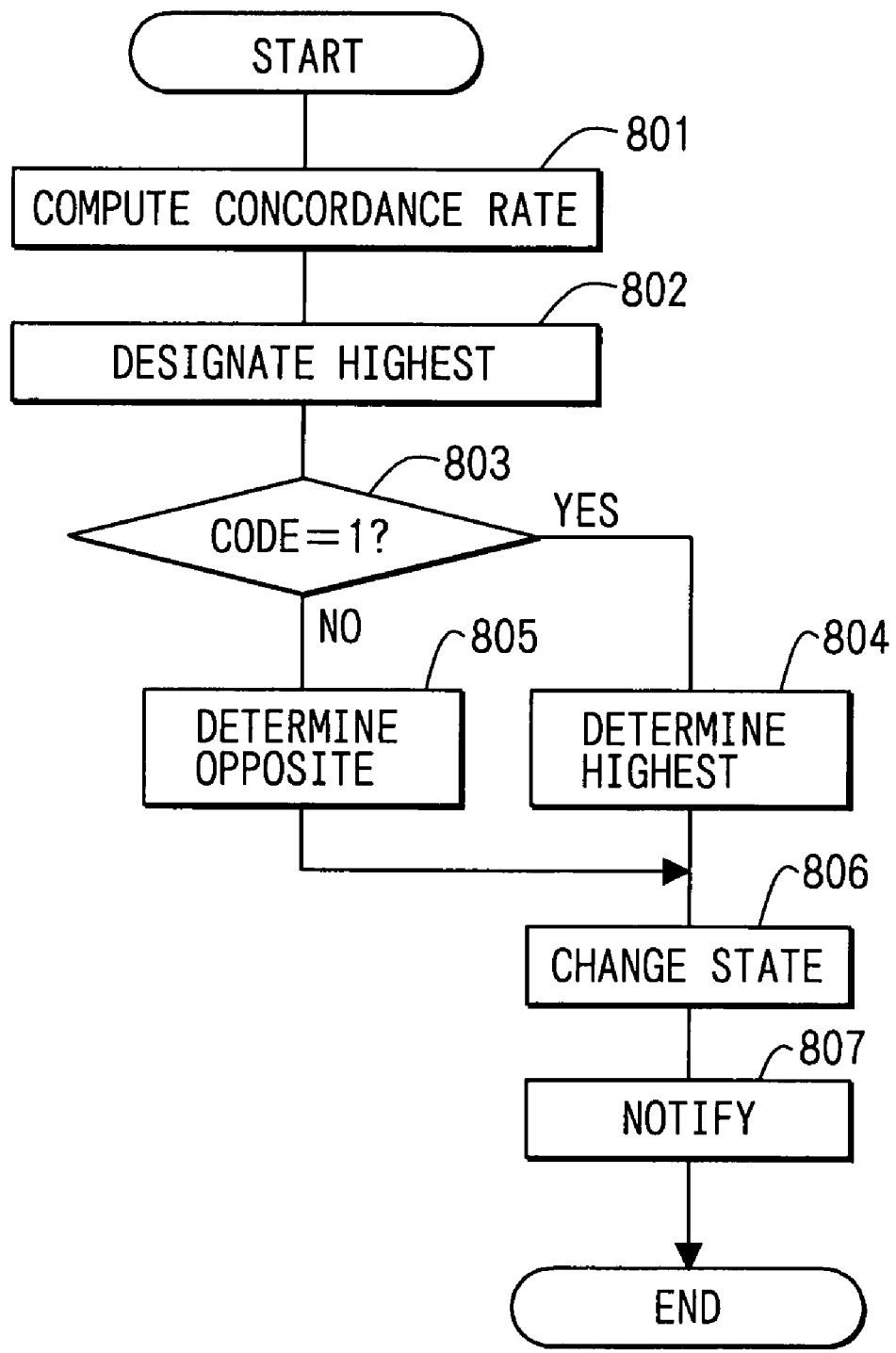
FIG. 8 is a flow diagram explaining processing of changing operating states of a target devices based on an uttered speech in a voice control system according to a third embodiment of the present invention.
Figure 9:
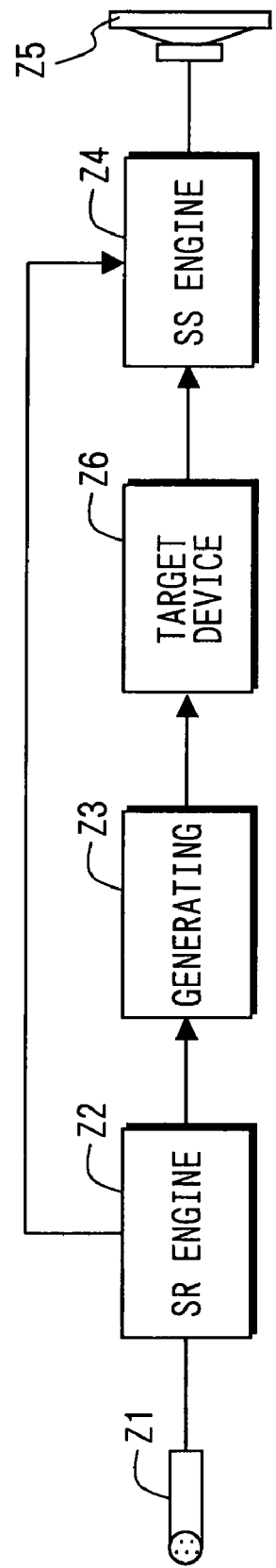
FIG. 9 is a block diagram showing structure for changing setting of a navigation system based on an uttered speech of a related art.

Processing of this embodiment for changing an operating state of a target device 2 will explained below with referring to FIG. 8.

At Step 801, concordance rates between the speech uttered by the user and reference commands in the SR dictionary 1b are computed.

At Step 802, a certain reference command that has the highest concordance rate is chosen. Here, as explained above, the certain reference command is supposed to be one of a given reciprocal pair of reference commands.

At Step 803, operating states of the target devices 2 are detected and a designating code of the certain reference is computed in the detected operating states of the target devices 2. When the computed designating code is "1," the certain reference command can be selected in the operating states of the target devices 2, and the processing proceeds to Step 804. Otherwise, the processing proceeds to Step 805.

At Step 804, the certain reference command is determined as the determined command corresponding to the speech uttered by the user.

At Step 805, an opposite reference command that is the other of the given reciprocal pair including the certain reference command is determined as the determined command corresponding to the speech uttered by the user. Thereby, even when the uttered speech is mis-recognized, in detail in a case where "TURN ON AUDIO" is mis-recognized as "TURN OFF AUDIO," operation that the user intends can be executed by substituting the opposite reference command.

At Step 806, a device-manipulating signal is generated correspondingly to the determined command determined at Step 804 or 805, so as to change the operating state of the relevant target device 2.

At Step 807, a piece of voice data for notifying the user that the operating state of the relevant target device 2 is changed is synthesized. The piece of voice data is then outputted to the speaker 7 and the change of the operating state of the relevant target device 2 is notified to the user.

Thus, a voice control system of this embodiment determines, as a determined command, either a recognized reference command or a reference command opposite to the recognized command, based on current operating states of target devices 2. Thereby, even when an uttered speech is mis-recognized, operation that is intended by the user can be securely executed.

In addition, when reference commands are for changing an operating state into multiple stepwise sub-states, designating codes of these reference commands are set to "1." This prevents executing the above-mentioned substitution of the opposite reference command for the recognized reference command. Thereby, user's confusion derived from a case, where the opposite command is substituted, can be prevented from occurring. For instance, it is assumed that a user utters a speech for increasing a voice volume of an audio when the voice volume is already in the highest level. In this case, if a reference command for decreasing the voice volume is substituted, the user supposes that the uttered speech is mis-recognized. Therefore, when the commands are for changing the operating state into the multiple stepwise sub-states, the substitution of the opposite command is not executed. This results in preventing the user's misunderstanding.

Modification

In the above embodiments, explanation is relating to a command for turning on or off operation of an audio, or for switching display of a navigation system. However, this invention can be directed to commands other than the above commands. For instance, it can be directed to a command for turning on or off light of a vehicle. It can be directed to a command for controlling, through a voice control, speed or moving direction of a moving object, such as a windshield wiper or a power window, which is moved back and forth within a range that can be detected.

The invention can be also directed to other target devices such as electric appliances, office automation devices, industrial devices, portable devices, or the like.

It will be obvious to those skilled in the art that various changes may be made in the above-described embodiments of the present invention. However, the scope of the present invention should be determined by the following claims.

What is claimed is:

1. A voice control system that recognizes a speech uttered by a user to thereby control a device that has a plurality of operating states, comprising:
    a storing unit for storing speech recognition data including a plurality of reference commands;
    a speech recognizing unit for recognizing the speech as a recognized reference command included in the reference commands stored in the storing unit;
    a detecting unit for detecting a certain operating state of the device; and
    a substituting unit for determining whether each of the reference commands recognized by the speech recognizing unit is a selectable reference command that can be selected in the certain operating state, and for substituting, when the recognized reference command is determined to be not the selectable reference command, one of the selectable reference commands for the recognized reference command,
    wherein, when the recognized reference command is one of a reciprocal pair of two reference commands that are for working oppositely to each other and the recognized reference command is determined to be not the selectable reference command, the substituting unit substitutes the other of the reciprocal pair for the recognized reference command.

2. The voice control system according to claim 1,
    wherein the reciprocal pair include an enabling reference command and a disabling reference command, and
    wherein the enabling reference command is for enabling one of that the device is running and that a function of the device is functioning, while the disabling reference command is for disabling one of that the device is running and that the function of the device is functioning.

3. The voice control system according to claim 1,
    wherein, if the certain operating state of the device is an operating state where a function of the device is functioning, and the function of the device functions in multiple steps, and each of the reciprocal pair controls the function of the device for moving into one of the multiple steps,
    then, even when the recognized reference command is one of the reciprocal pair and is determined to be not the selectable reference command, the substituting unit is configured to prevent substituting the other of the reciprocal pair for the recognized reference command.

4. The voice control system according to claim 3, further comprising:
    a notifying unit for notifying that the recognized reference command cannot be executed.

* * * * *